(12) United States Patent
Hill et al.

(10) Patent No.: US 7,599,915 B2
(45) Date of Patent: Oct. 6, 2009

(54) PORTAL LINKING TOOL

(75) Inventors: Timothy A. Hill, Roswell, GA (US); Zakir S. Patrawala, Atlanta, GA (US); Karthiksundar Sankaran, Alpharetta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 454 days.

(21) Appl. No.: 11/041,681

(22) Filed: Jan. 24, 2005

(65) Prior Publication Data

US 2006/0168541 A1 Jul. 27, 2006

(51) Int. Cl.
G06F 17/30 (2006.01)
G06F 3/00 (2006.01)
G06F 7/00 (2006.01)

(52) U.S. Cl. .................. 707/3; 715/742; 707/104.1
(58) Field of Classification Search ............. 707/10, 707/3, 104.1; 715/742
See application file for complete search history.

(56) References Cited

U.S. PATENT DOCUMENTS

| | | | | |
|---|---|---|---|---|
| 5,900,005 A * | 5/1999 | Saito | ...................... | 715/531 |
| 6,029,141 A * | 2/2000 | Bezos et al. | ................... | 705/27 |
| 6,072,486 A * | 6/2000 | Sheldon et al. | ............. | 715/835 |
| 6,184,886 B1 * | 2/2001 | Bates et al. | ................. | 715/760 |
| 6,185,573 B1 * | 2/2001 | Angelucci et al. | ........ | 707/104.1 |
| 6,256,623 B1 * | 7/2001 | Jones | ........................... | 707/3 |
| 6,460,060 B1 * | 10/2002 | Maddalozzo et al. | ........ | 715/513 |
| 6,590,596 B1 * | 7/2003 | Rector | ........................ | 715/763 |
| 6,826,594 B1 * | 11/2004 | Pettersen | ..................... | 705/26 |
| 6,912,532 B2 * | 6/2005 | Andersen | ..................... | 707/10 |
| 2003/0144924 A1 * | 7/2003 | McGee | ........................ | 705/27 |

* cited by examiner

Primary Examiner—Vincent Boccio
(74) Attorney, Agent, or Firm—Scott P. Zimmerman, PLLC

(57) ABSTRACT

Embodiments of the present disclosure provide systems and methods for retrieving web documents. Briefly described, in architecture, one embodiment of the system, among others, includes a web retrieval tool interface configured to display a context menu from any web page that is being viewed. The context menu displays at least one option for retrieving a document at a predetermined network address. The system further includes logic configured to retrieve the document corresponding to a selected option in the context menu. Other systems and methods are also provided.

18 Claims, 18 Drawing Sheets

PORTAL LINKING TOOL

TECHNICAL FIELD

The present disclosure is generally related to network communications and, more particularly, is related to web pages.

BACKGROUND

Many users utilize Internet portal sites in browsing content located on the Internet. A portal site may provide a variety of categories of informational content that a user may access. For example, some portal sites offer a directory of web sites, a facility to search for other sites, news, weather information, e-mail, stock quotes, phone and map information, a community forum, etc. A common occurrence is that after performing a search for information or accessing a link from the portal site, users leave the portal site to visit other web sites.

A number of methods have been developed to attempt to bring a user back to a portal site, such as a toolbar located on a browser, setting a default homepage in the browser, etc. However, these methods require a user to choose to manually return to the portal site after browsing the contents of another web site. Therefore, a user may likely not remember to return to the portal site or may not want to lose his or her place within an Internet browsing session to return to the portal site. This is problematic, since many portal sites generate revenue based on how often a user frequents a portal site and how many pages a user accesses from the portal site.

Thus, a heretofore unaddressed need exists in the industry to address the aforementioned deficiencies and inadequacies.

SUMMARY

Embodiments of the present disclosure provide systems and methods for retrieving web documents. Briefly described, in architecture, one embodiment of the system, among others, includes a web retrieval tool interface configured to display a context menu from any web page that is being viewed. The context menu displays at least one option for retrieving a document at a predetermined network address. The system further includes logic configured to retrieve the document corresponding to a selected option in the context menu.

Embodiments of the present disclosure can also be viewed as providing methods for retrieving web documents. In this regard, one embodiment of such a method, among others, can be broadly summarized by the following steps: displaying at least one option for retrieving a web page at a predetermined web site, where a selected phrase from a currently viewed web page is included as part of a resource locator for retrieving a web document from the predetermined web site; and retrieving the web document from the predetermined web site in accordance with a selected option, wherein the contents of the web document is formulated from the selected phrase provided in the resource locator.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
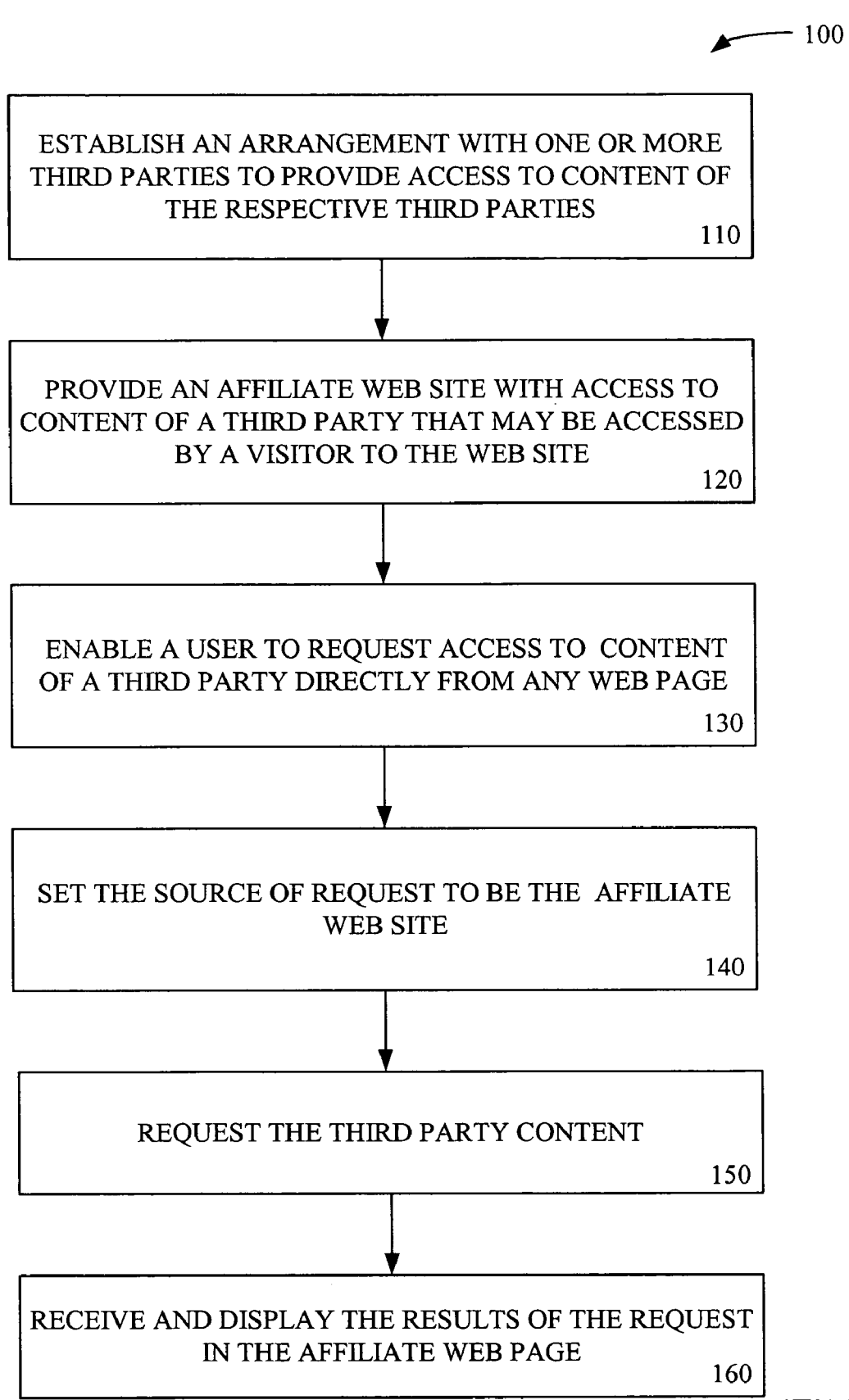
FIG. 1 is a flowchart diagram showing the functionality of a representative implementation of one embodiment of a portal linking system.

Various embodiments of the present disclosure now will be described more fully with reference to the accompanying drawings. Embodiments of the disclosure may include many different forms and should not be construed as limited to the embodiments set forth herein. These embodiments are intended to convey the scope of the disclosure to those skilled in the art. Furthermore, all "examples" given herein are intended to be non-limiting.

Components of a portal linking system of the present disclosure can be implemented in software, firmware, hardware, or a combination thereof. In one embodiment of the disclosure, which is intended to be a non-limiting example, system components are implemented in software that is executed by a computer, for example, but not limited to, a personal computer, workstation, mini computer, mainframe computer, personal digital assistants, mobile phones, etc.

The software-based system, which comprises an ordered listing of executable instructions for implementing logical functions, can be embodied in any computer-readable medium for use by, or in connection with, an instruction execution system, apparatus, or device such as a computer-based system processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus or device. The computer-readable medium can be, for example, a portable computer diskette (magnetic), a random access memory (RAM) (magnetic), a read-only memory (ROM) (magnetic), an erasable programmable read-only memory (EPROM or Flash memory) (magnetic), optical, and a portable compact disk read-only memory (CD ROM).

In some embodiments, the portal linking system of the present disclosure is implemented with use of a communication network, such as the Internet. As such, a brief description and explanation of terms associated with the Internet follow. A browser, or "web" browser, allows for simple graphical user interface (GUI) access to network servers, which support documents formatted as so-called web pages. The World Wide Web (WWW), or "web", is a collection of servers on the Internet that utilize a Hypertext Transfer Protocol (HTTP), which is an application protocol that provides users access to files (which can be in different formats such as text, graphics, images, sound, video, etc.) using a Standard Generalized Markup Language (SGML). SGML is an information management standard for providing platform-independent and application-independent documents that retain formatting, indexing, and linking information. SGML provides a grammar-like mechanism for users to define the structure of their documents and the tags they will use to denote the structure in individual documents. The page description language known as Hypertext Markup Language (HTML) is an application of SGML. HTML provides basic document formatting of text and images and allows the developer to specify hyperlinks, or "links," to other servers and files.

Use of an HTML-compliant client, such as a web browser, involves specification of an address via a Uniform Resource Locator (URL). Upon such specification, the client makes a TCP/IP request to the server identified in the URL and receives a "web page" (namely, a document formatted according to HTML) in return.

The flowchart of FIG. 1 shows the functionality of a representative implementation 100 of one embodiment of the portal linking system. With regard to all flow charts described herein, each block represents a module, segment, or portion of code, which comprises one or more executable instructions for implementing the specified logical function(s). It should also be noted that in some alternate implementations, the functions noted in the blocks may occur out of the order noted. For example, two blocks shown in succession may in fact be executed substantially concurrently, or the blocks may sometimes be executed in the reverse order, depending upon the functionality involved.

In this particular process 100, a provider of an affiliate web site, such as a portal site, establishes (110) an arrangement with one or more third parties to provide access to content (e.g., applications, web pages, etc.) of the respective third party for some type of consideration, such as financial reimbursement. The third party in such an arrangement may be referred to as a partner of the affiliate web site. Note, a third party does not necessarily have to be the source or originator of the content of the third party. For example, a third party may provide access to content that is and/or originated from another source.

Generally, a partner (e.g., a provider of an online merchant web site) pays an affiliate (e.g., provider of a portal site) a commission to direct users to content provided by the partner (e.g., the online merchant web site). The commission may be based on the number of people the affiliate sends to a partner's web site or the number of people the affiliate sends who buy something or perform some other desired action. For example, some arrangements pay according to the number of users who visit a page containing a banner advertisement provided by the partner or third party.

Note, a particular party may be an affiliate and a partner. For example, a provider of a search engine may be an affiliate to an online merchant web site ("partner") that sells hats. Thus, the search engine provider may attempt to direct users who perform a search on the term "hat" to the online merchant web site which sells hats. To do so, the search engine provider displays a link to the merchant web site amongst search results for the term "hat." Therefore, if a user accesses the link from search engine results, then the online merchant may provide a commission to the search engine provider.

Further, the search engine provider may also make an arrangement with another web site provider. In this arrangement, the web site provider agrees to provide the search engine interface on its portal web site and in return, the search engine provider will share revenue from the online merchant web sites that are generated from the search engine interface from the portal web site. Therefore, if a user accesses the search engine interface from the portal site and receives a link to the online merchant web site from search results from the search engine provider, the online merchant will then pay a commission to the search engine provider if the user accesses the link. Further, the search engine provider will share the fee with the portal site provider. Between the search engine provider and the portal web site provider, the provider of the portal web site is an affiliate of the search engine provider. Correspondingly, the search engine provider is a partner to the portal web site provider. Basically, there are a number of arrangements that an affiliate can enter into with a partner. In other words, an affiliate program could be set up based upon any action that would benefit a partner (or third party) and then pay an affiliate based on the number of customers who performs the desired action and are sent by the affiliate to the application or web site of the partner.

Referring back to FIG. 1, an affiliate web site is provided (120) with access to content (e.g., applications or sites) of a third party (e.g., partner) that may be accessed by a visitor to the affiliate web site. For example, a portal web site ("affiliate site") may provide access to a search engine of a third party ("partner") and encourage users to use the services of the search engine. In return, the third party may provide the provider(s) of the portal site a portion of the revenue that the third party receives from advertisers that is based on the number of visitors the third party receives to its search engine.

For example, to facilitate users to access content (e.g., web pages, applications, etc.) of a third party, a user is enabled (130) to request access to third party content (e.g., applications or sites) directly from any web page. In this way, a user does not have to be visiting an affiliate site at the time that the user chooses to access content of a partner (of the affiliate). However, after the user indicates that the users wants to access content of a partner, the request for the content is sent from the affiliate to the partner. In other words, the source of the request is set (140) to be the affiliate site and not the web site currently being visited by the user, as is discussed in detail hereinafter.

Thus, the affiliate site requests (150) content from the third party or partner of the affiliate (e.g., by communicating with databases maintained by the third party provider or partner). Then, the results of the request for the third party content are displayed (160) within the confines of the affiliate site, in some embodiments.

For example, if a user requested a search to be performed by a third party from a portal page, the search results are shown from the portal page. Alternatively, if a user requested a web page of the third party to be retrieved from an affiliate site, the requested web page is shown inside a frame of the affiliate site. In this manner, a user of the affiliate site is conveniently and frequently returned to an affiliate site, such as a portal site, during a browsing session. Advantageously, by directing a user to the content of the third party, the provider of the affiliate site receives (180) reimbursement from the third party (in accordance with the agreement between the affiliate and the third party).

Figure 2:
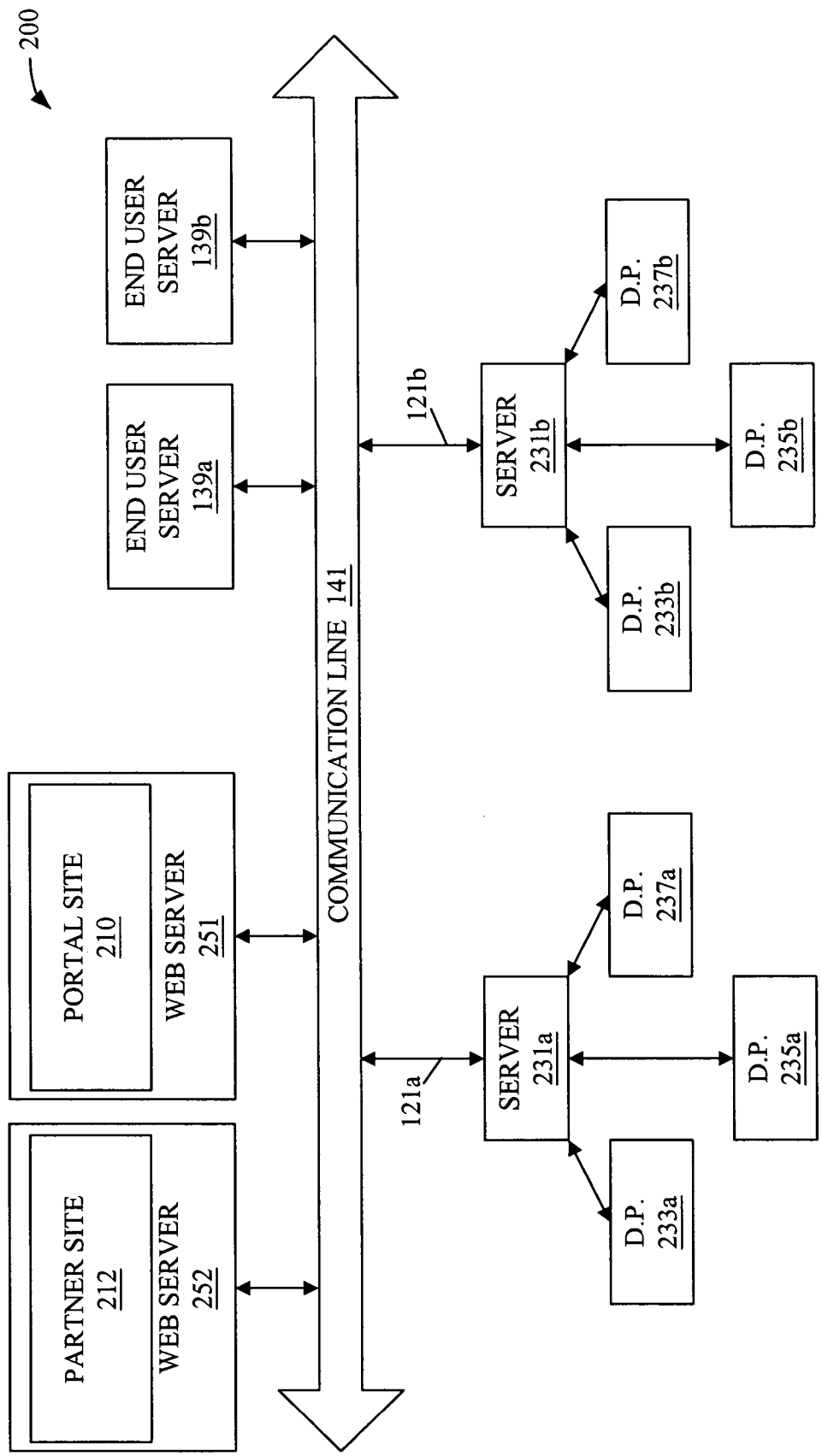
FIG. 2 is a diagram of an Internet based system upon which one embodiment, among others, of the portal linking system FIG. 1 may be implemented.

By way of example and illustration, FIG. 2 illustrates a typical Internet based system upon which one embodiment, among others, of the portal linking system 200 of the present disclosure may be implemented. It should be noted that while the present disclosure provides implementation of the portal linking system 200 within an Internet based system, the portal linking system 200 need not be provided via use of the Internet. Instead, one of reasonable skill in the art will appreciate that the portal linking system 200 may be implemented within other mediums, such as, for example, but not limited to, a local area network, or wide area network.

Referring to FIG. 2, a plurality of networks 221a, 221b are shown wherein each network 221a, 221b includes multiple digital processors 233a, 235a, 237a, and 233b, 235b, 237b, respectively. Digital processors 233a, 233b, 235a, 235b, 237a, 237b may include, but are not limited to, personal computers, mini computers, laptops, and the like. Each digital processor 233a, 233b, 235a, 235b, 237a. 237b may be coupled to a host processor or server 231a, 231b for communication among processors 233a, 233b, 235a, 235b, 237a, 237b within the specific corresponding network 221a, 221b.

According to an exemplary embodiment, the host processor or server 231a, 231b is coupled to a communication line 241 that interconnects or links the networks 221a, 221b to each other, thereby forming an Internet. As such, each of the networks 221a, 221b are coupled along the communication line 241 to enable access from a digital processor 233a, 235a, 237a of one network 221a to a digital processor 233b, 235b, 237b of another network 221b. Various end-user servers 239a, 239b, two of which are shown as an example, are linked to the communication line 241, thus providing end-users with access to the Internet. Generally, a portal web site 210 (and applications provided by the portal web site 210) may be maintained on a web server 251 that is connected to the Internet for communication among the various networks 221a, 221b and/or digital processors 233a, 233b, 235a, 235b, 237a, 237b and other end-users connected to the Internet via respective end-user servers 239a, 239b. Other web server(s) 252 also maintain web site(s) 212 and/or applications of third parties or partners of the portal site.

Figure 3:
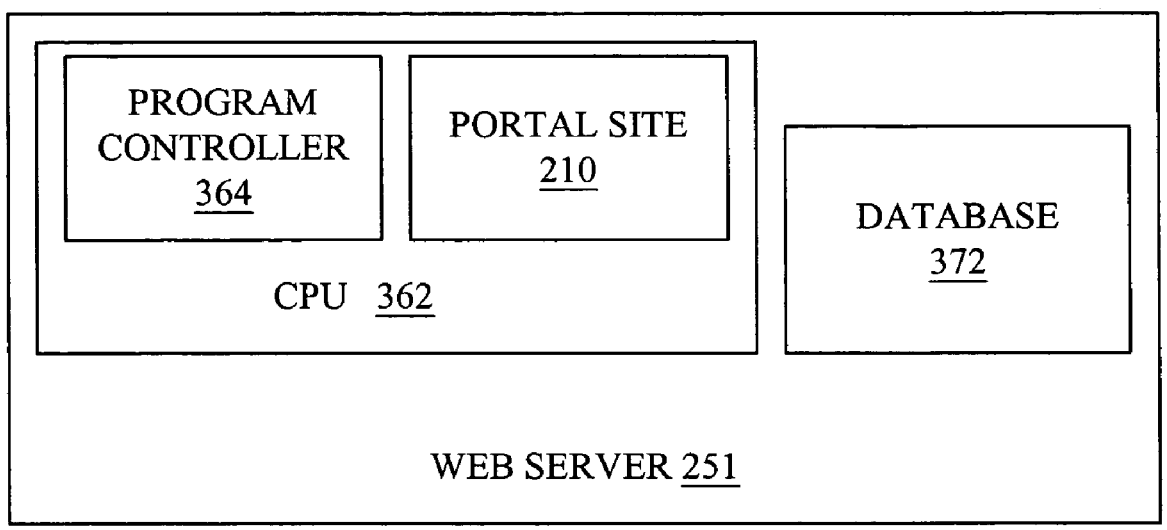
FIG. 3 is a block diagram of a web server of FIG. 2.

FIG. 3 is a block diagram that further illustrates the web server 251 of FIG. 2. As shown by FIG. 3, the web server 251 comprises a central processing unit (CPU) 362 having a program controller 364 and software 110 for implementing the portal web site 210. The program controller 364 is capable of performing functionality required by the portal linking system 100, as described in detail hereinbelow. The web server 251 also comprises a web server database 472, which holds data necessary to enable the web server 251 to customize a portal site 210 in accordance with settings associated with a particular user. It should be noted that other information may be stored within the web server database 372 in accordance with one exemplary embodiment of the disclosure.

Figure 4:
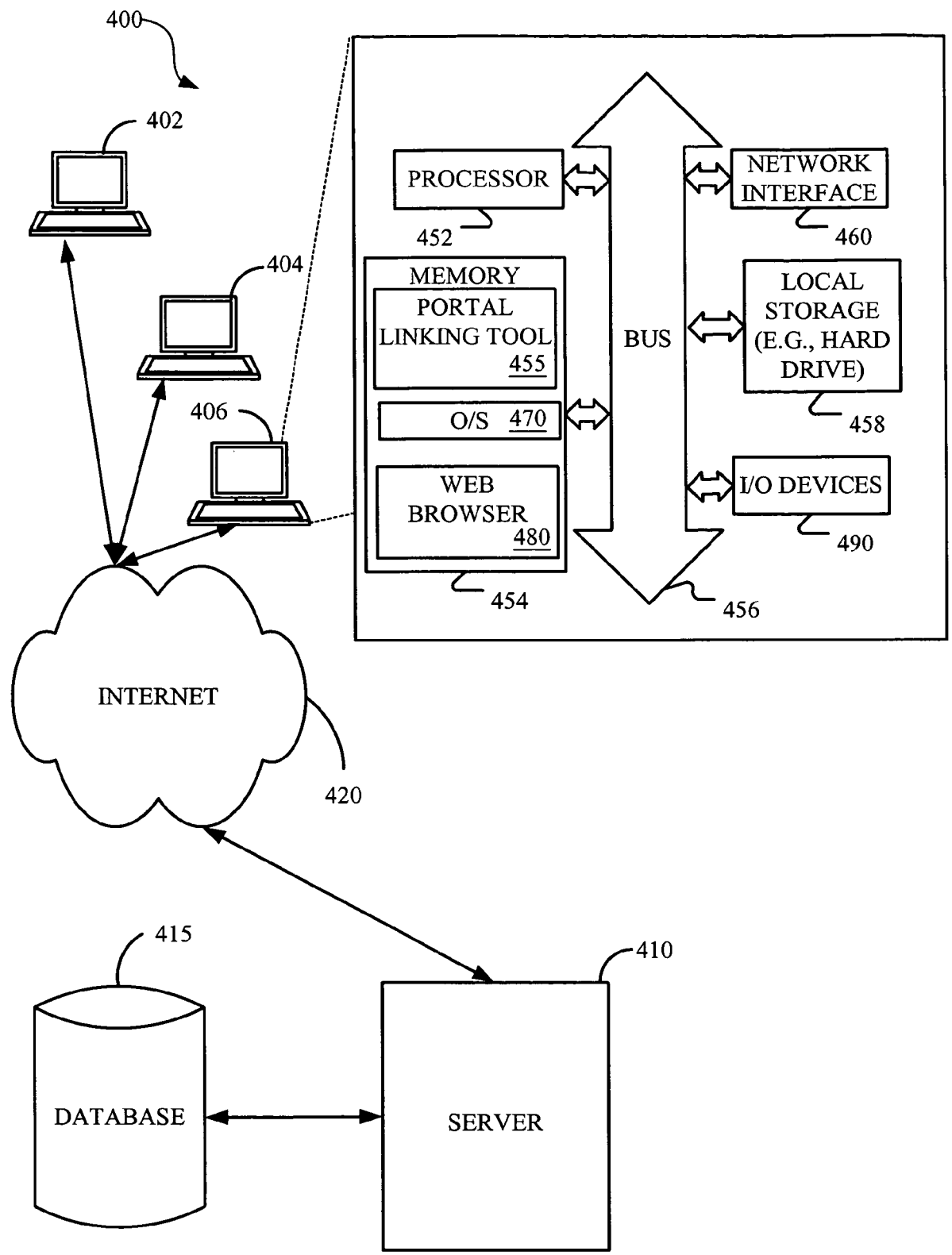
FIG. 4 is a block diagram of one embodiment of a browser system for accessing web documents from the web server of FIG. 3.

Next, FIG. 4 is a block diagram of one embodiment of a browser system 400 for accessing web pages (including portal web sites) and other documents from web server 251. As shown in FIG. 4, the browser system 400 comprises general-purpose computers 402, 404, 406 that are coupled to a server 410 over a network such as the Internet 420. The communication network 420 provides access to Internet services such as email, file transfer protocols (FTP), World Wide Web (WWW), Internet Relay Chat (IRC), etc. and newsgroups, such as Usenet, among others. The server 410 is coupled to a database 415 that stores user-setting profiles of various users.

In the operating environment shown in FIG. 4, a user of a general-purpose computer 406 (or other computing device such as a personal digital assistant) attempts to access stored applications on the computer 406 and network services from the network 420. As shown in FIG. 4, the general-purpose computer 406 includes a processor 452, a network interface 460, memory 454, a local storage device 458, and a bus 456 that permits communication between the various components. While not explicitly shown, it should be appreciated that the other computers 402, 404 may also include similar components that facilitate computation or execution of applications on the computers 402, 404. In some embodiments, among others, the local storage device 458 is a hard drive configured to electronically store data. The local storage device 458 may also store computer programs that execute on the computer 406. In this sense, the processor 452 is configured to access any program that is stored on the local storage device 458, and execute the program with the assistance of the memory 454.

The network interface 460 is configured to provide an interface between the general-purpose computer 406 and the network 420. Thus, the network interface 460 provides the interface for the computer 406 to receive any data that may be entering from the network 420 and, also, to transmit any data from the computer 406 to the network 420. Specifically, in some embodiments, the network interface 460 is configured to permit communication between each of the computers 402, 404, 406 and the server 410 and, additionally, to permit communication between the computers 402, 404, 406 themselves. In this regard, the network interface 460 may be a modem, a network card, or any other interface that communicatively couples each of the computers 402, 404, 406 to the network. Since various network interfaces are known in the art, further discussion of these components is omitted here.

In the embodiment of FIG. 4, a portal linking tool 455 is shown as being loaded into memory 454 for launching at the general-purpose computer 406, thereby permitting a user of the general-purpose computer 406 to access content provided on the affiliate web page from any web page a user is currently visiting.

The portal linking tool 455 of one embodiment can be implemented in software, firmware, hardware, or a combination thereof. In some embodiments, the portal linking tool 455 is implemented in software, as an executable program, and is executed by a special or general-purpose digital computer 406, such as a personal computer, workstation, minicomputer, or mainframe computer. In various embodiments, the portal linking tool 455, as software, is downloaded from the Internet by the general-purpose computer 406 and subsequently installed on the general-purpose computer 406. In some other embodiments, the portal linking tool 455, is provided via computer disks, computer cards, or other file-storage devices, or is pre-installed on the general-purpose computer 406.

The memory 454 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 454 may incorporate electronic, magnetic, optical, and/or other types of storage media. Note that the memory 454 can have a distributed architecture, where various components are situated remote from one another, but can be accessed by the processor 452.

The software in memory 454 may include one or more separate programs, each of which comprises an ordered listing of executable instructions for implementing logical functions. In the example of FIG. 4, the software in the memory 454 includes the portal linking tool 455, a web browser application 480, and an operating system (O/S) 470. The operating system 470 controls the execution of other computer programs, and provides scheduling, input-output control, file and data management, memory management, and communication control and related services.

The portal linking tool 455 may be a source program, executable program (object code), script, or any other entity comprising a set of instructions to be performed. If the portal linking tool 455 is a source program, then the program should be translated via a compiler, assembler, interpreter, or the like, which may or may not be included within the memory 454, so as to operate properly in connection with the O/S 470. Furthermore, the portal linking tool 455 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 490 may include input devices, for example but not limited to, a keyboard, mouse, scanner, digital camera, multi-function device, digital sender, microphone, etc. Furthermore, the I/O devices 490 may also include output devices, for example but not limited to, a printer, display, etc. Finally, the I/O devices 490 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

The software in the memory 454 may further include a basic input output system (BIOS) (omitted for simplicity). The BIOS is a set of software routines that initialize and test hardware at startup, start the O/S 470, and support the transfer of data among the hardware devices. The BIOS is stored in ROM so that the BIOS can be executed when the computer 406 is activated.

When the computer 406 is in operation, the processor 452 is configured to execute software stored within the memory 454, to communicate data to and from the memory 454, and to generally control operations of the computer 406 pursuant to the software. The portal linking tool 455, web browser 480, and the O/S 470, in whole or in part, are read by the processor 452, perhaps buffered within the processor 452, and then executed.

Figure 5:
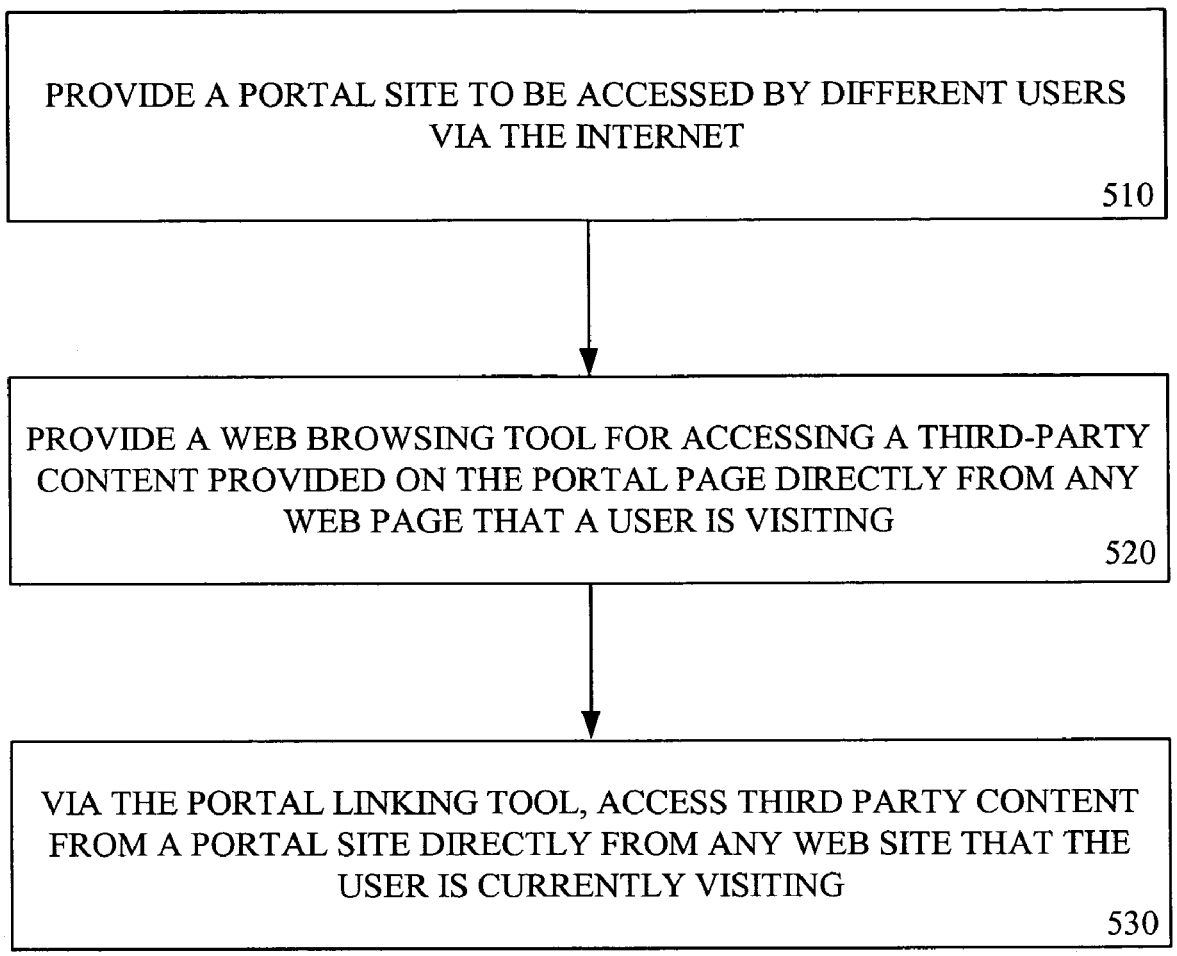
FIG. 5 is a flowchart diagram illustrating a process in which a provider of a portal site provides informational content to a user within the system of FIG. 4.
Figure 6:
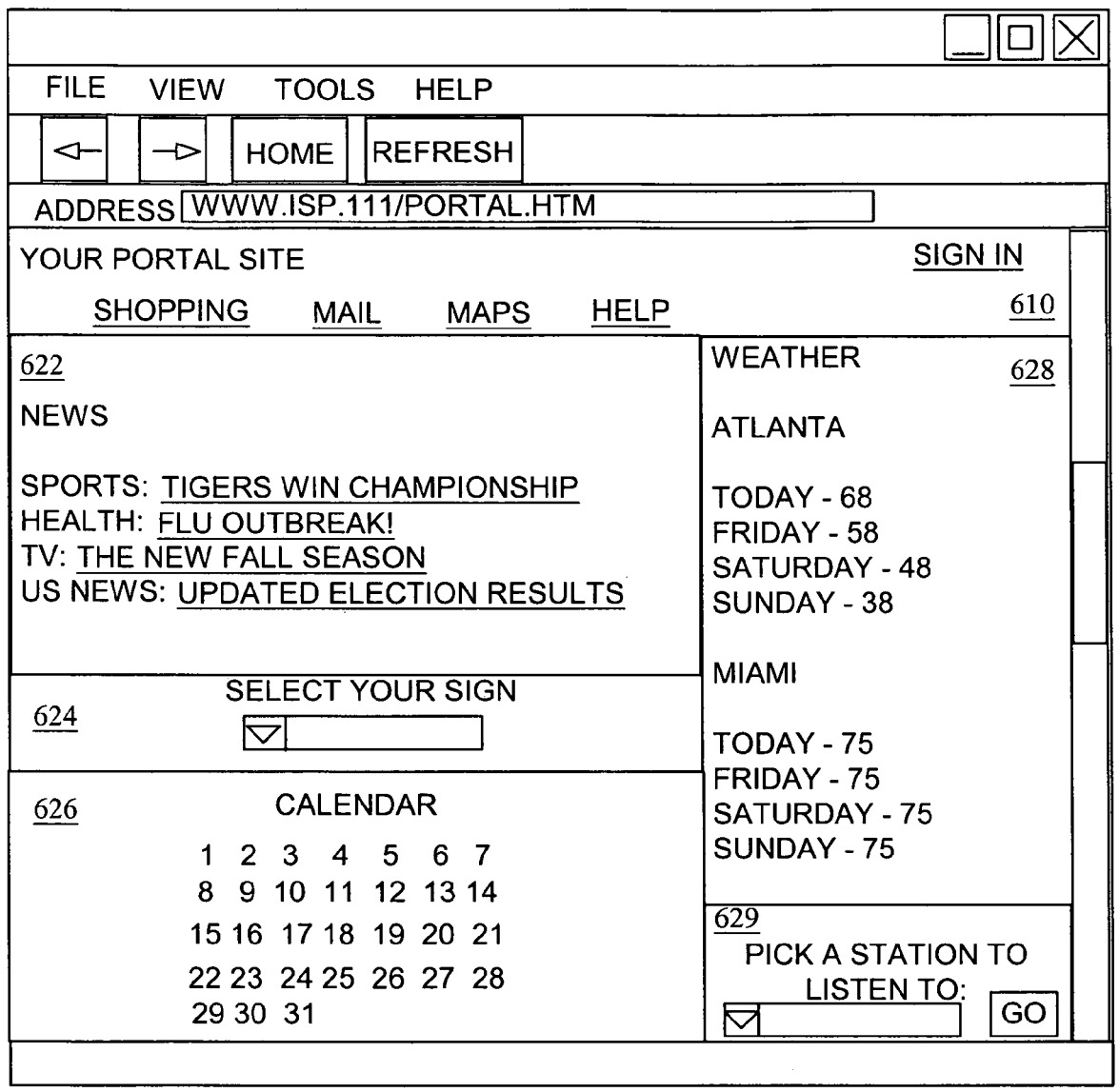
FIGS. 6-17 are diagrams representing a sample web browsing session involving the portal linking tool of FIG. 4.

Next, FIG. 5 is a flowchart illustrating a process in which a provider of a portal site provides informational content to a user. As shown by block 510, a provider provides a portal site to be accessed by different users via the Internet. The layout of the portal site may include different information boxes for which users can choose an array of content feeds from different databases, such as news headlines or local movie listings. In addition, interfaces to different applications, such as search engines, are featured predominantly within the web site. Some applications within the portal site may be provided by third parties, such as commercial sources. The provider of the portal site may receive revenue from a third party based upon the frequency that a user accesses content provided the third party, how much time users spend on the portal, and how many pages they navigate. Revenue is maximized when users spend a lot of time accessing content provided by a partner, such as search applications, telephone directory searches, shopping sites, or portal pages featuring advertising from a partner.

Accordingly, in block 520, the provider of the portal site provides a portal linking tool 455 for accessing third party content on the portal site directly from any web page that a user is visiting. Accordingly, a user installs the portal linking tool 455 on a web browser 480. For example, in some embodiments, a link may be provided from a toolbar on the web browser 480 or provided from a portal site where a user can click on the link and install the portal linking tool application on a user's computer.

As shown by block 530, the user then visits a web site and chooses to access third party content from a portal site directly from the web site that the user is visiting. For example, in some embodiments, the user can select text from an external web page (e.g., highlight the text with a mouse control or keyboard commands) and then perform a right-click operation to select a particular application from a context-menu.

As a result, the portal linking tool 455 directs the user to the portal site where the requested third party content may be viewed. In this way, a provider of a portal site can receive revenues from a third party for the content that was accessed by the user, and the user can access the content easily from any web page in a simple click or series of clicks of a mouse control, for example. Further, by automatically and repeatedly bring a user back to a portal site, it is convenient to a provider of the portal site and also to the user himself or herself. Since the portal site may be customized or tailored to the preferences of the user, by revisiting the portal site, the user can monitor and track items of interests, such as sports scores, the user's mail inbox, news updates, stock prices, etc. In addition, the provider of the portal site can receive revenue from the variety of applications or links that are accessed by a user in his or her browsing session that are initiated by the user while browsing an external web page (to that of the portal site).

To illustrate the operation of one embodiment of the portal linking system 100, FIGS. 6-17 represent a sample web browsing session involving the portal linking tool 455. For example, a user often starts a browsing session from a homepage or a portal site that is automatically retrieved when a web browsing application 480 is activated. Thus, in FIG. 6, a user is viewing a portal site 610 featuring a variety of informational boxes 622-629 on a variety of subjects, such as the weather, a calendar, news, etc. In some embodiments, the layout of the portal site 610 can be personalized based on settings that have been specified by a current user or established by the web site based on previous viewing habits of the current user. With such further personalization, a user can customize a portal site to satisfy his or her tastes, including what information is shown and how it is shown.

Figure 7:
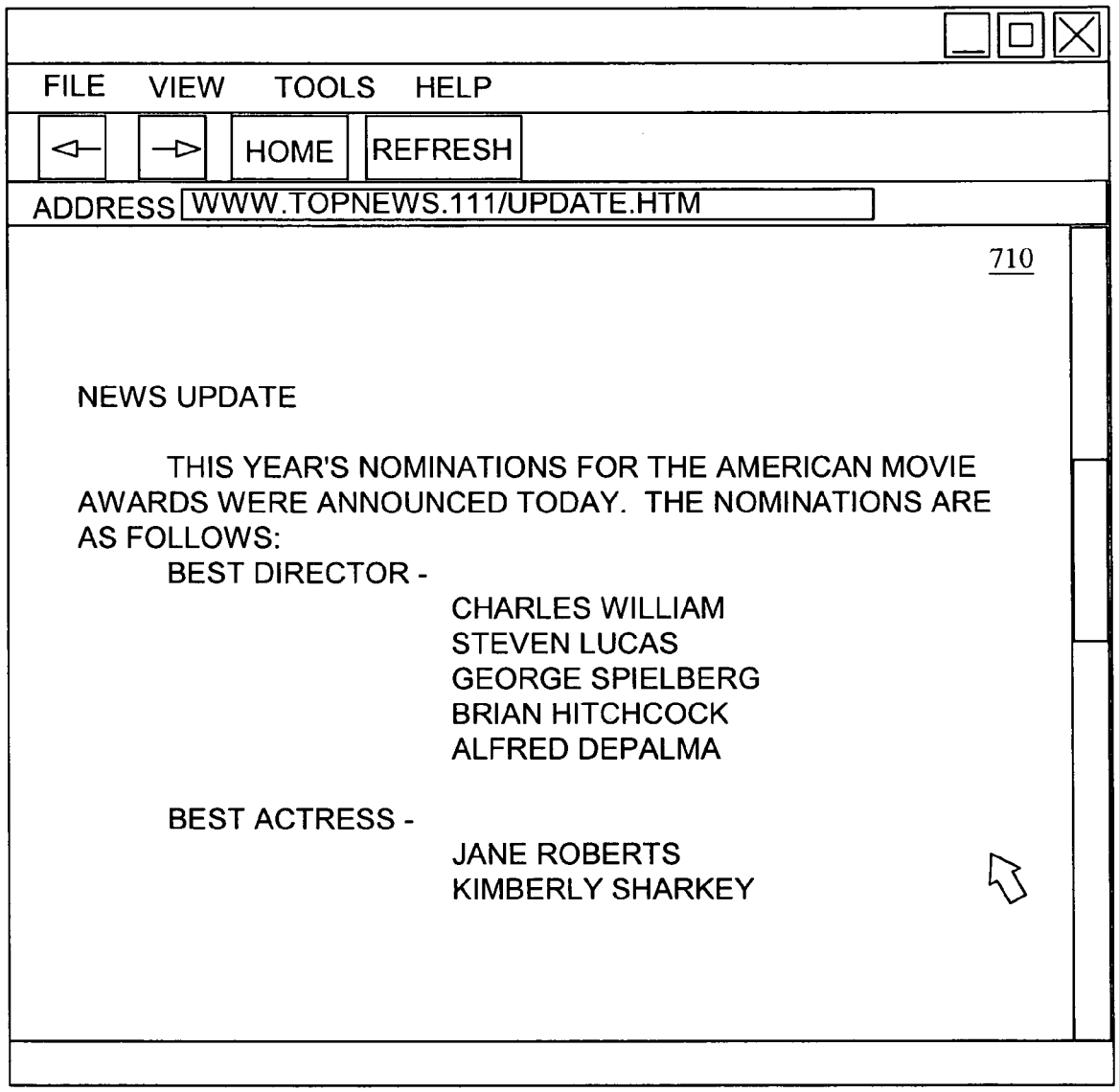

While a user is browsing content on the Internet (or some other communication network), the user may select links or applications (e.g., content) provided by the portal site that takes the user away from the portal site. Further, the user may manually enter a web site into the address bar of his or her web browsing application or select a saved URL that is stored in a list of URL's (such as a bookmark file). Accordingly, FIG. 7 represents a web page that a user is visiting that is external to or not part of the portal site 610 of FIG. 6. Here, a user is reading a news article about movie award nominations. While viewing the article, the user may encounter a word or phrase that the user is interested in exploring. Therefore, in accordance with one embodiment, the user can select or highlight the word or phrase (e.g., scrolling across the phrase with a mouse control while holding down the left mouse button; holding down the shift key of a keyboard while pressing an arrow key, etc.) and activate a context menu (e.g., pressing the right button of a mouse control while a cursor is pointing at the highlighted text; pressing the context menu key on a keyboard while a cursor is pointing at the highlighted text, etc.) containing an option for processing the selecting text by means of an external application.

Figure 8:
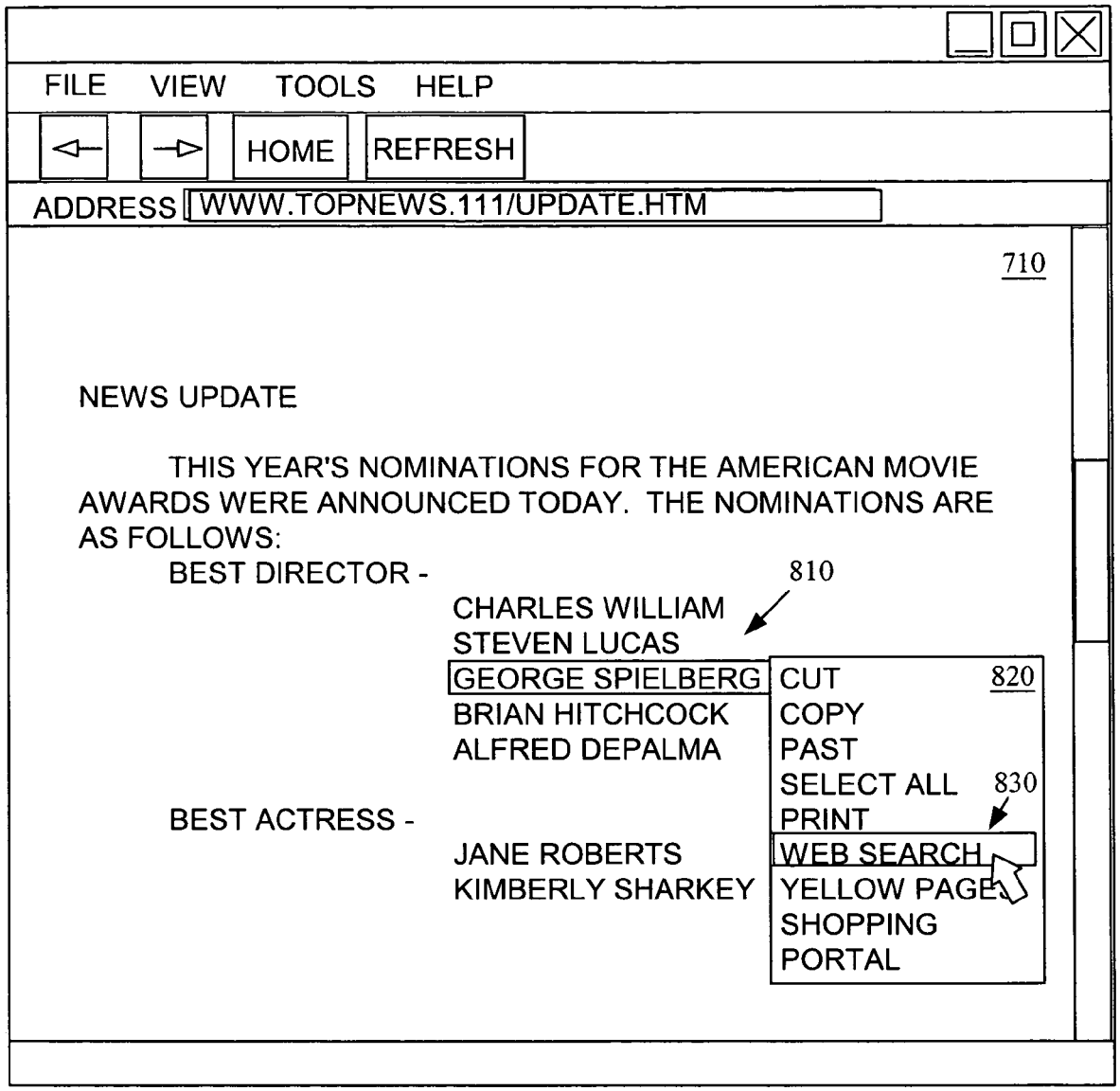

For example, in FIG. 8, a user has highlighted the phrase "George Spielberg" 810 and activated a context menu 820. Within the context menu, the user has selected the option of a Web Search 830. The Web Search application generally searches for instances of the selected phrase (e.g., "George Spielberg") in other web documents and returns the results of the search to the user. In accordance with the present disclosure, the application that performs the Web Search in the context menu 820 is an application associated with a particular affiliate web site, such as the portal page 610 of FIG. 6. Thus, the portal linking tool 455 allows users to select text from any web page from any web site and invoke a desired search from a context menu.

As such, by selecting the option of Web Search 830 in the context menu 820, a command is sent to an affiliate site that is in partnership with the provider of the Web Search application. The affiliate site may also host an interface to the Web Search application, such that when a user accesses content from the Web Search partner using the search interface on the affiliate site, the affiliate site earns a commission.

Regardless, when a user selects the Web Search option 830 from the context menu 820, a command is generated to the affiliate site to obtain search results (e.g., third party content) for the user for the selected text. For example, a selected option of the context menu may cause the web browser 455 to request a URL that directs a server of the affiliate site to retrieve the search results from a server of the provider of the search application.

Figure 9:
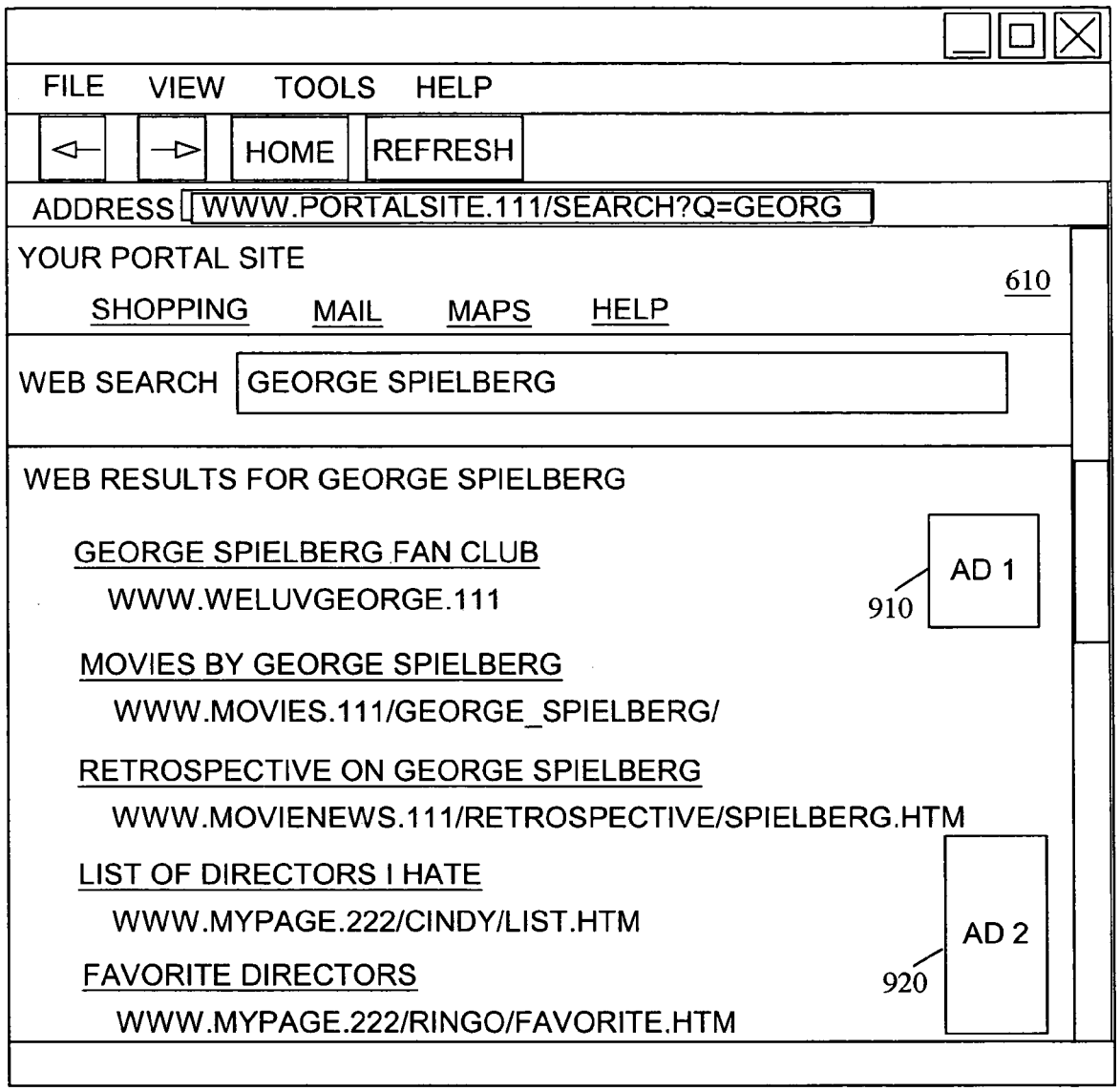

Thus, the affiliate web site requests content from the search provider and displays the results to the user, as shown in FIG. 9. In turn, the affiliate site is credited as being the source of the request and receives credit for directing traffic to the third party content. For example, advertising revenue (such as that from advertisements 910, 920 shown by web pages generated by the application) can be provided to the provider of the affiliate site 610 in accordance to any arrangements that have been established between the provider of the affiliate site and the provider of the search results 930. Moreover, the response to the request is presented within the confines of the affiliate site, as shown in FIG. 9, which is the portal site 610 of FIG. 6, in this example. In this way, the user is brought back to the portal site 610 so that it can conveniently track and monitor informational content that has been tailored for the user.

Note, in some embodiments, web pages generated by an application or site selected within the context menu 820 are launched in a new window of the web browsing application 480. Alternatively, in some other embodiments, the web pages are generated from the same window of the web browser that a user was viewing in creating the request from the context menu 820.

Figure 10:
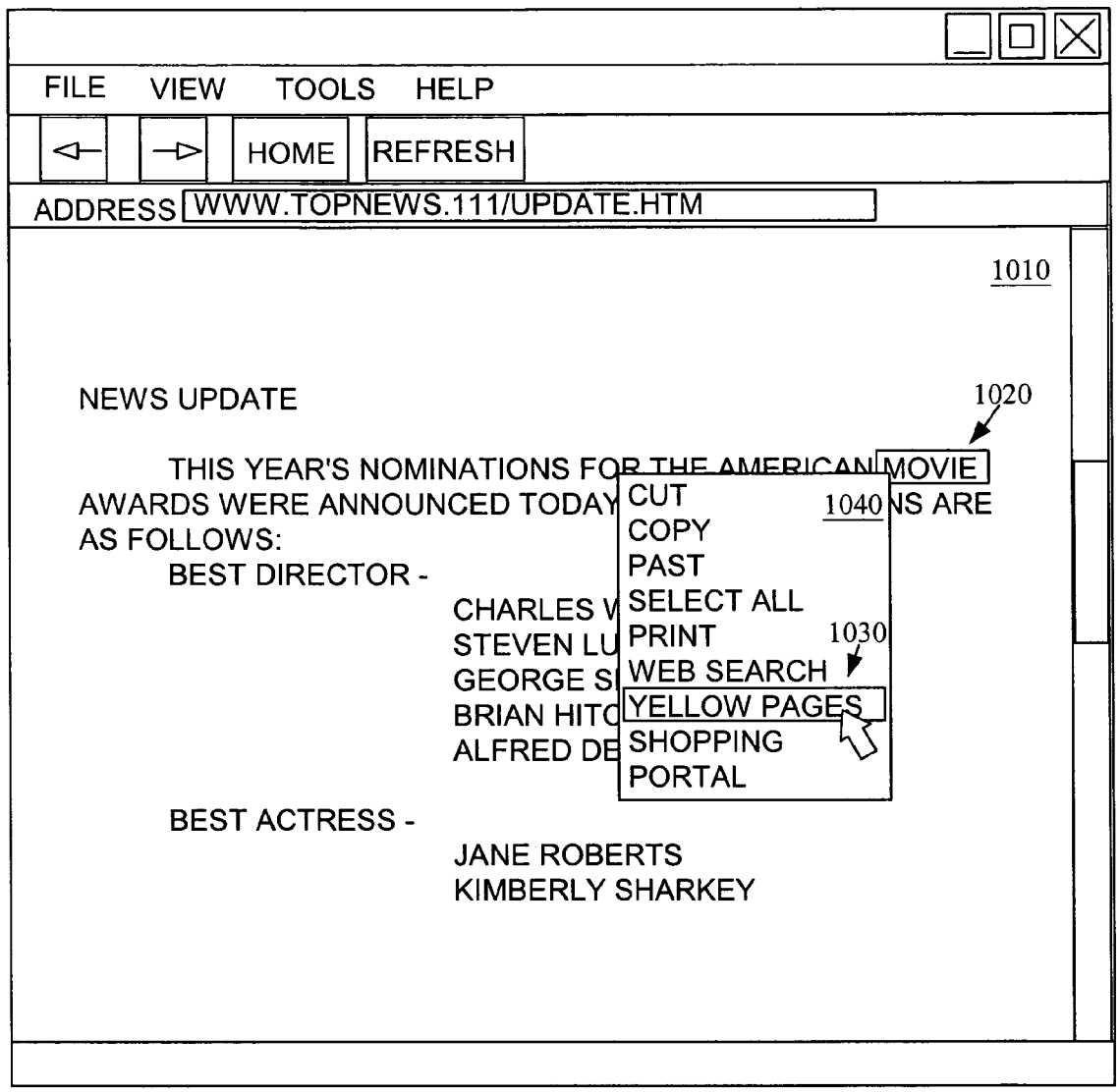
Figure 11:
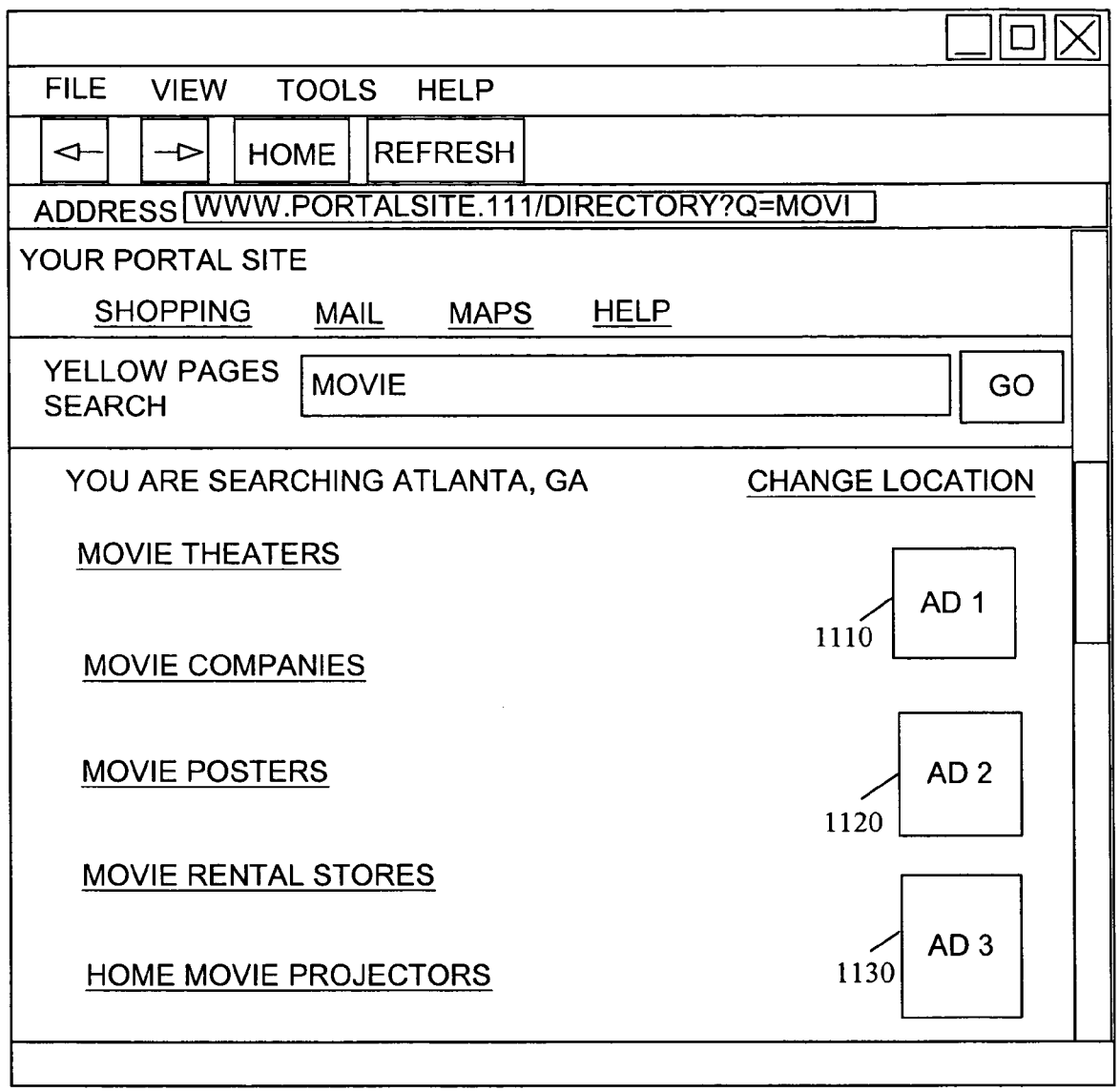

In accordance with the present disclosure, more than one option may be provided in the context menu 1040 for processing selected text. For example, FIG. 10 shows a web page 1010 where a user has selected the word "MOVIE" 1020 and has chosen a "YELLOW PAGES" application 1030 to be executed with regard to the selected word/phrase. In this example, the Yellow Pages application performs a look-up search of entries from a listing of commercial businesses that contain or are associated with the selected word/phrase. In accordance with select embodiments of the present disclosure, the portal linking tool, as represented by the entries in the context menu 1010, sends the user request to the affiliate web site which communicates with databases maintained by the provider of the application in order to return results of the request back to the affiliate web site. The results and any additional content are then displayed to the user as part of the affiliate web site, as shown in FIG. 11, as the user is returned to the portal web site during his or her browsing session. Correspondingly, the user can seamlessly monitor his or her information on the portal site and the provider of the portal site can be credited with delivering a user to a web page that is being sponsored or subsidized by one or more advertisers (that supply web advertisements AD1 1110, AD2 1120, AD3 1130).

Figure 12:
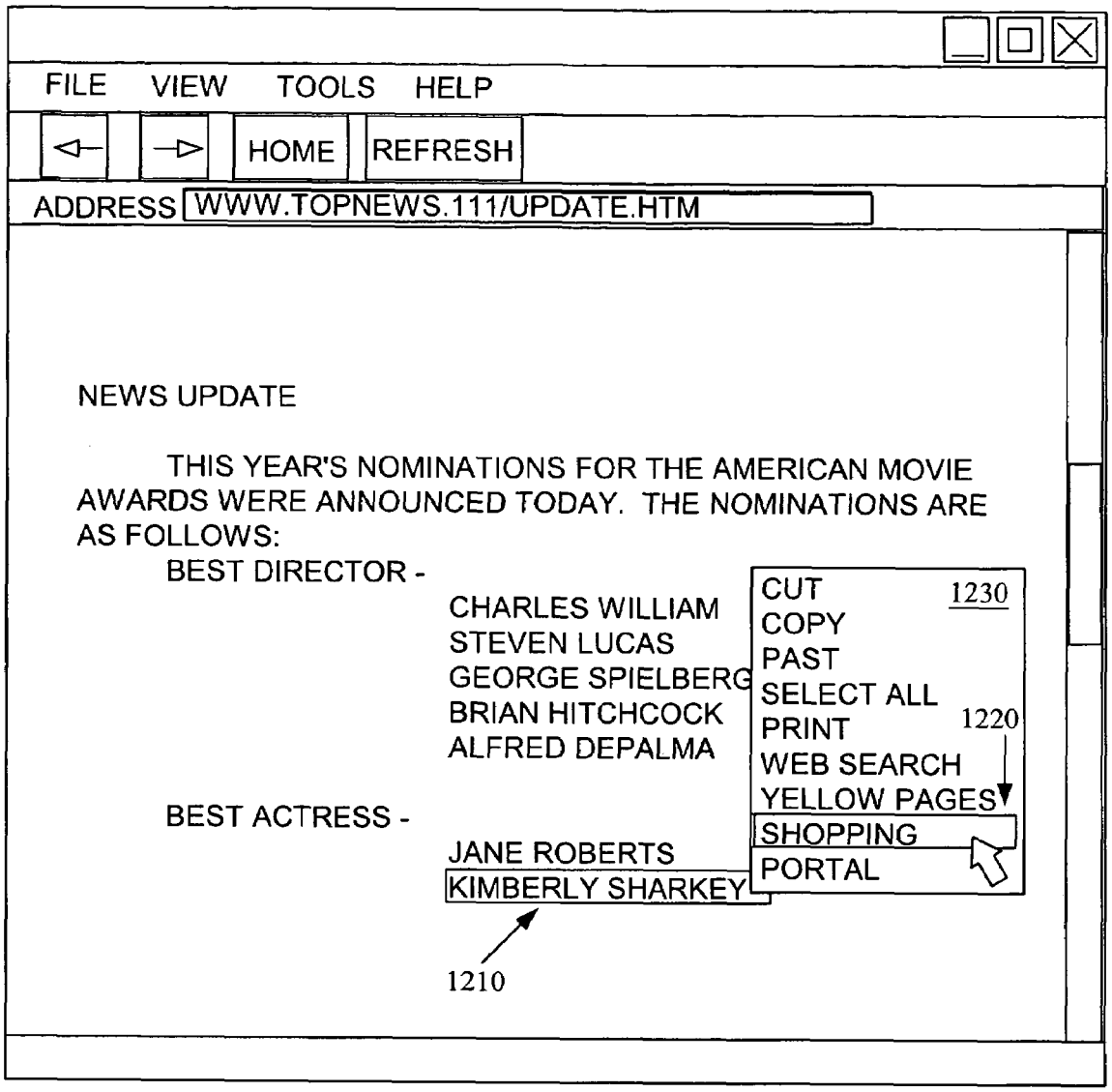
Figure 13:
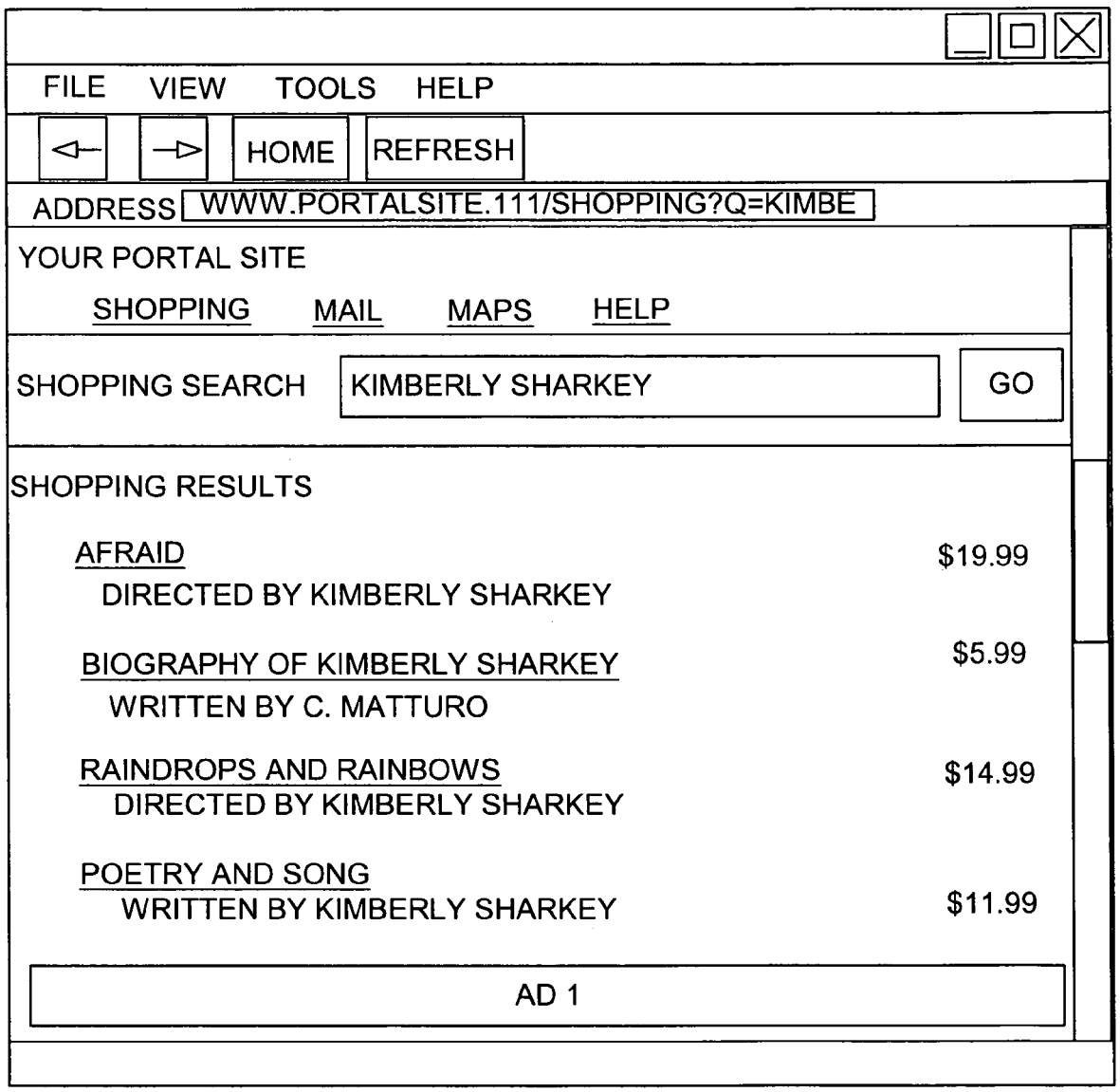
Figure 14:
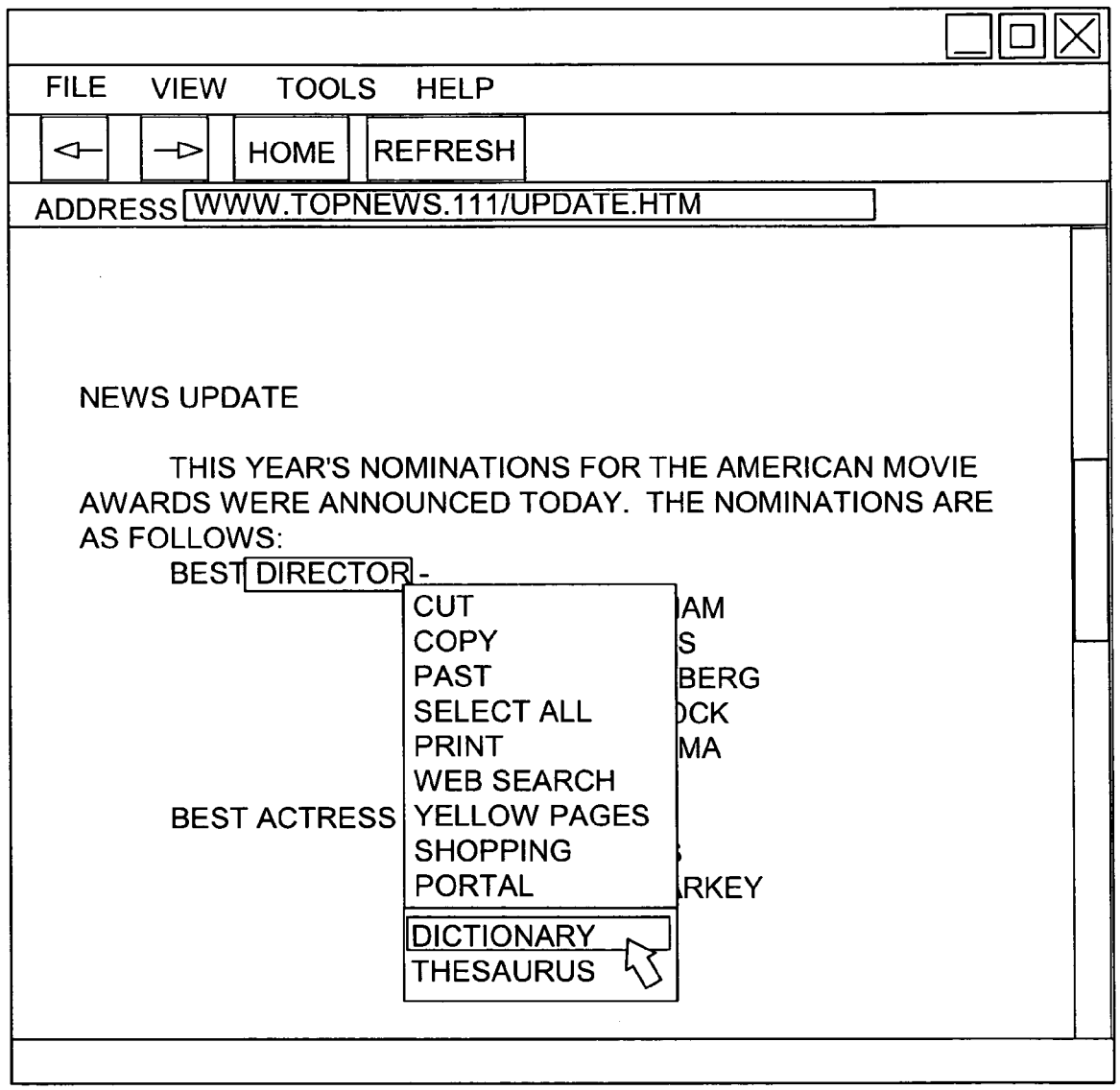
Figure 15:
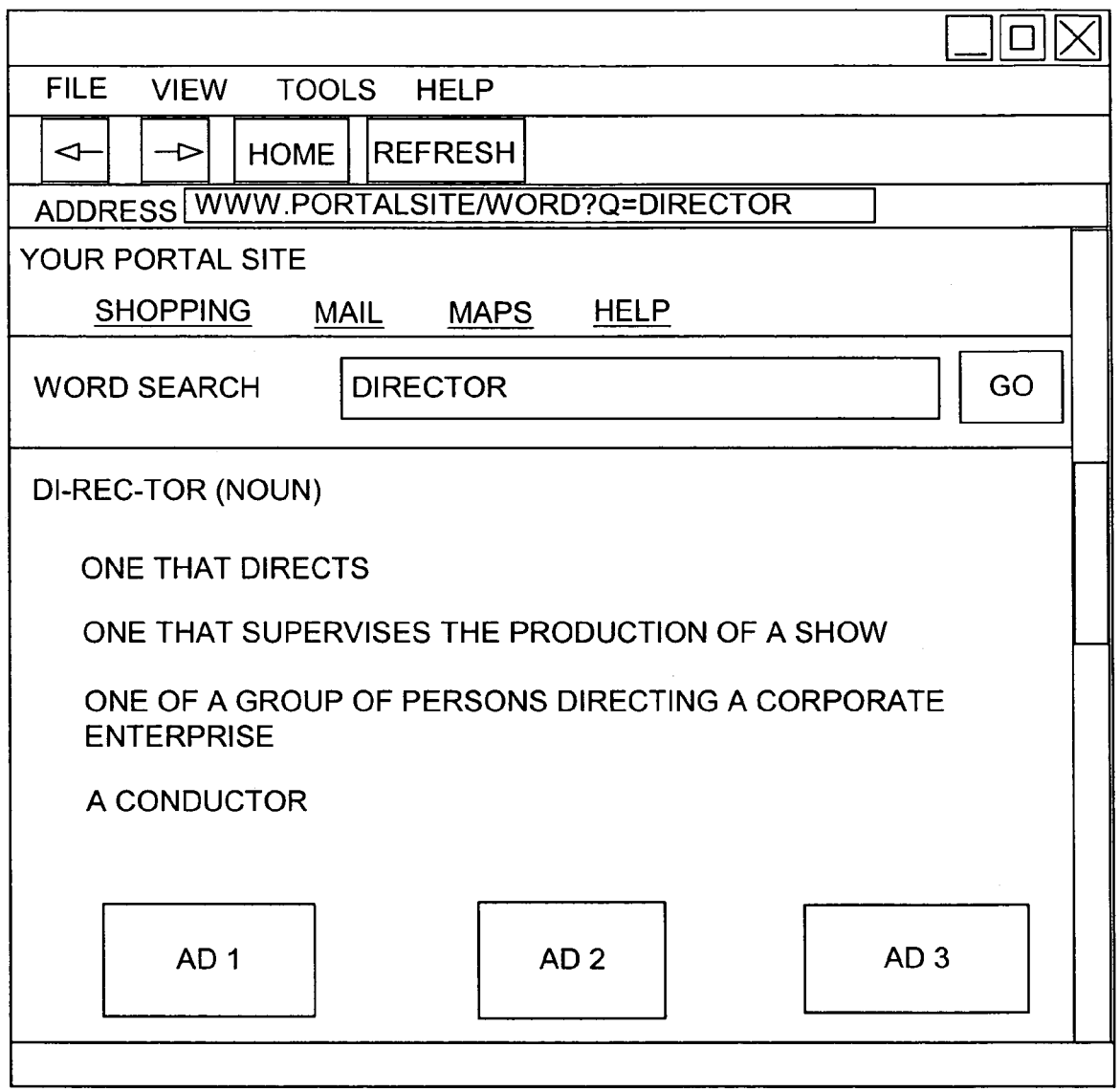

Next, FIG. 12 demonstrates another application being accessed from a context menu. Here, a user has highlighted the phrase "Kimberly Sharkey" 1210 and also selected the option "SHOPPING" 1220 from the context menu 1230. As a result, a request or query is sent to the application associated with the "SHOPPING" option 1220 at the affiliate web site. The SHOPPING application communicates with databases maintained by a third party or provider of the SHOPPING application in order to retrieve listings of items that are for sale from various web sites, where the listings are associated, in some way, with the selected phrase. Since the request is sent to a third-party application at an affiliate site, the results of the request (and any additional content) are also displayed within the affiliate site, as shown in FIG. 13. Therefore, a user is returned to his or her portal page and revenues from advertisements shown on the resulting page may be shared with the affiliate site provider. Similarly, FIGS. 14-15 demonstrate that, in some embodiments, a meaning of a selected word (e.g., "DIRECTOR") may also be explored in a similar fashion.

Figure 16:
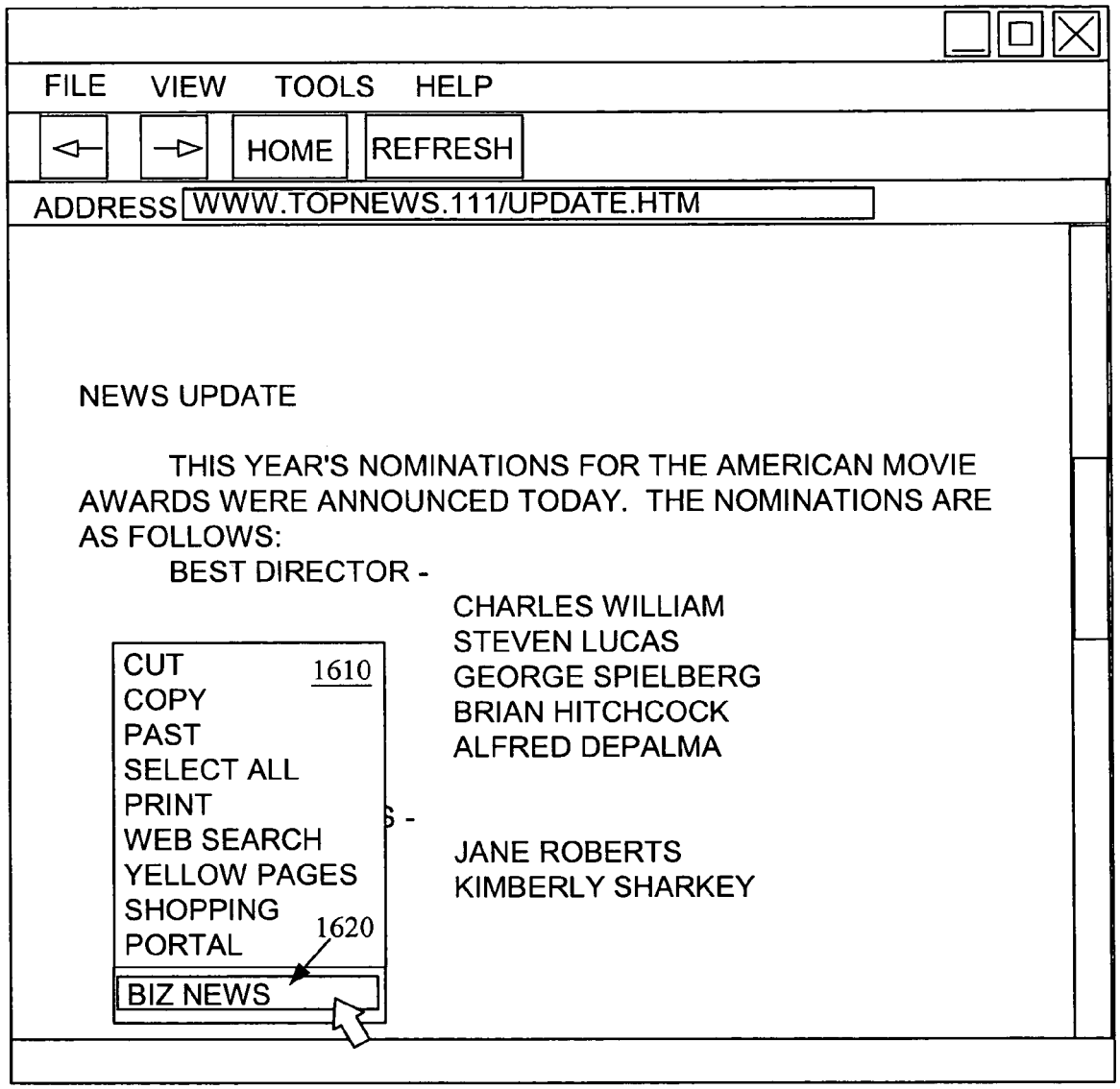

Operations from the context menu are not limited to those involving selected text. For example, FIG. 16 shows a user selecting an option 1610 from the context menu 1620 for "BIZ NEWS." In this example, the user is requesting content from a web site that provides business news. Alternatively, the user may have been able to also access this web site from a link from another site, such as a portal site 610, or may have manually typed the address for the site into the address bar of his or her web browsing application.

Figure 17:
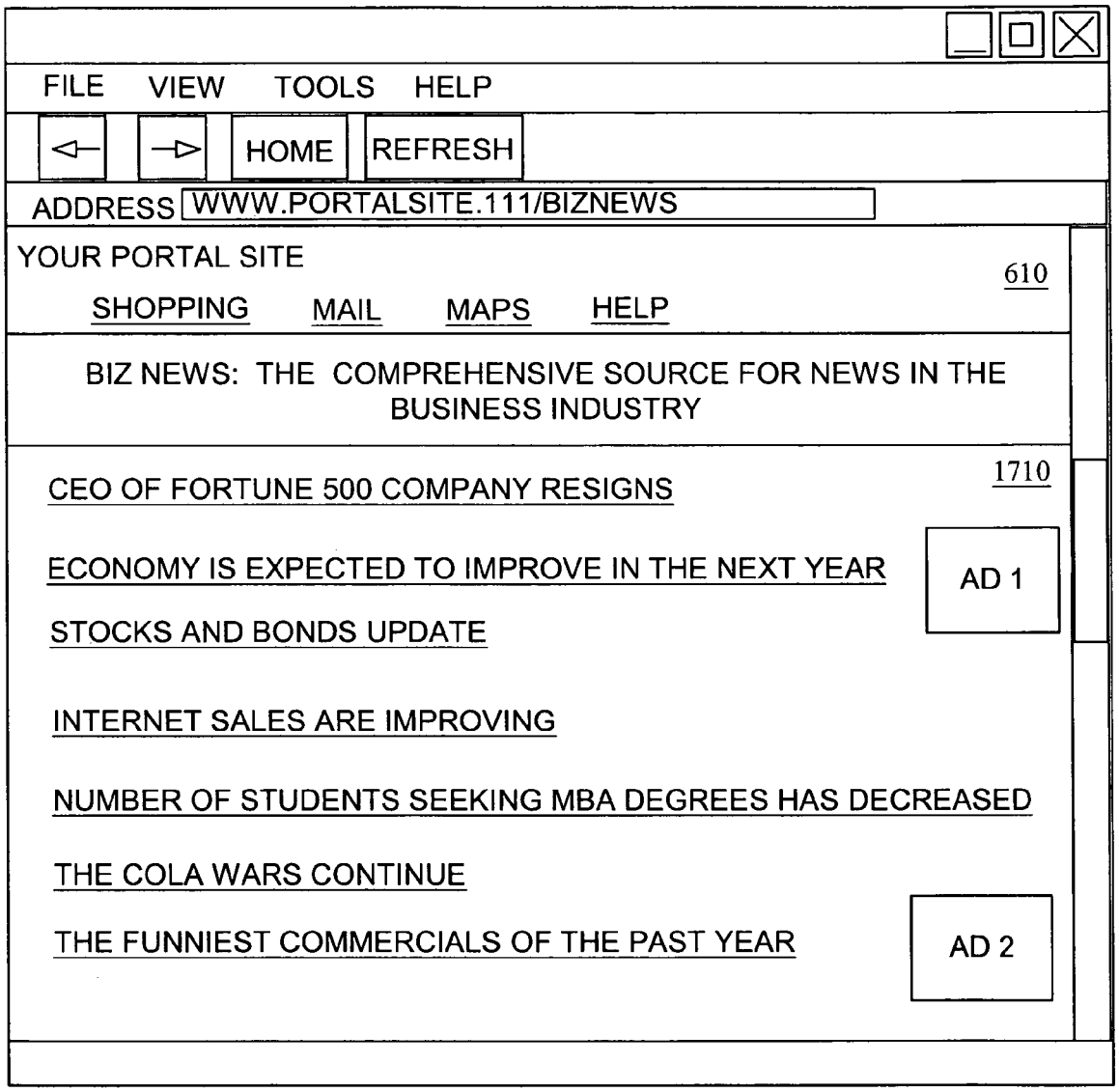

However, remembering the address of the portal site 610 or temporarily visiting the portal site to access a link may be inconvenient for a user. Therefore, in this example, the user can activate the context menu 1610 (without selecting any text from the current web page) and select an option (BIZ NEWS) 1620 for requesting the desired web site from a context menu. The request for the desired web page identifies the source of the request as being from the affiliate web site and displays the requested web contents 1710 within the framework of the portal site 610, as shown in FIG. 17. Therefore, the portal site 610 can also be credited with directing a user to content of a third party.

Figure 18:
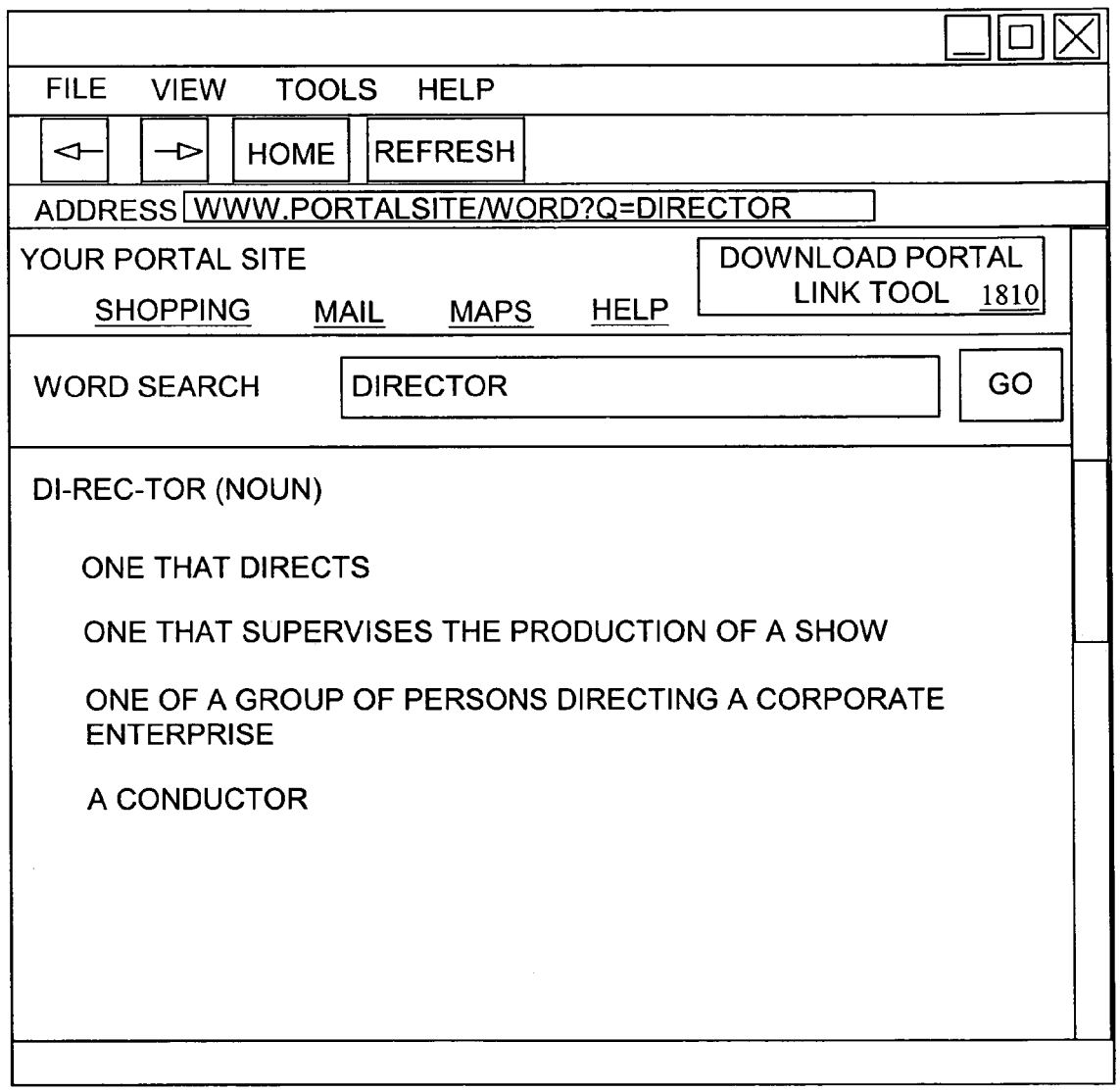
FIG. 18 is a diagram of a portal site having a button for installing the portal linking tool of FIG. 4.

As previously discussed, in some embodiments, a link or button may be provided from a portal web page for installing the portal linking tool to a user's web browser. To demonstrate, FIG. 18 shows a button 1810 that is provided from the portal site 610 to initiate installation of the portal linking tool 455 to a user's web browsing application 480. Generally, installation of the portal linking tool, in some embodiments, involves adding an entry in the registry of the operating system 470 associated with the context menu of the web browsing application so that the operating system 470 can determine when a context menu should be activated and can determine what type of context menu should be generated for a particular operation (e.g., a right click on selected text within a web page opened within a web browsing application).

Within the registry entry or key for a particular context menu option (e.g., SHOPPING), a label (e.g. "SHOPPING") is created for the new entry and an HTML file is specified (along with its location). The specified HTML file is to be used to handle or process the request associated when the new context entry is selected in the context menu. The specified HTML file contains instructions or script that are to be executed for a particular entry. For example, for a SHOPPING option, the script (e.g., Javascript®) would contain instructions for requesting a search from a SHOPPING application at a affiliate site for the selected word or phrase. Therefore, the script can obtain the contents of the selected text and process the selected text to retrieve the desired results.

For example, consider a first web page displaying text and an interface to a search application. A user desires to perform a search function on a particular phrase contained in the text. One approach the user may take is to type the phrase into the search interface located on the web page and execute the search. For this situation, a provider of the web site may receive a commission from the provider of the search results. However, for the user, a simpler approach exists. For example, in accordance with select embodiments of the present disclosure, the user may highlight the desired phrase and execute the search by selecting the search option from a context menu. Note, this approach is significantly simpler than the first described approach. Further, since the search request is generated from another web site or network address, a commission may be provided to a provider of the other web site that is not currently being visited by the user, which is also beneficial for the provider of the other web site.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) without departing substantially from the spirit and principles of the disclosure. For example, a variety of documents may be opened by a web browser and can be used in association with the portal linking tool. For instance, the web browser, in some embodiments, may open a non-HTML file (e.g., a .TXT file, etc.) and select a phrase for performing a particular operation from the non-HTML file. All such modifications and variations are intended to be included herein within the scope of this disclosure.

Therefore, having thus described the invention, at least the following is claimed:

1. A system for retrieving web documents, comprising:
   means for requesting and downloading a portal website at a client;
   means for downloading a portal linking tool to the client that permits a web browser to access the portal website from any website;
   means for requesting a different website at the client that is external to the portal website;
   means for downloading the different website;
   means for highlighting text in the different website;
   a web retrieval tool interface configured to display a context menu interface, the context menu displaying at least one option for searching other web documents for the highlighted text using a search provider associated with the portal website;
   means for sending a command from the client to the portal website to obtain search results for the highlighted text;
   means for again downloading the portal website at the client, such that the search results are generated within the confines of the portal website; and
   means for crediting the portal website as a source of the search request, such that the portal website receives credit for directing traffic to the search provider, and the different website receives no credit for the search request.

2. The system of claim 1, further comprising:
   sending a request from the client for a uniform resource locator; and
   directing a portal website server to retrieve the search results from a search server of the search provider.

3. The system of claim 1, further comprising setting the source of the search request to be the portal website and not the different website being visited by the client.

4. A method for retrieving web documents, comprising:
   requesting and downloading a portal website at a client;
   downloading a portal linking tool to the client that permits a web browser to access the portal website from any website;
   requesting a different website at the client that is external to the portal website;
   downloading the different website;
   highlighting text in the different website;
   activating a context menu in the portal linking tool that presents an option to search for other web documents containing the highlighted text using a search provider associated with the portal website;
   sending a command from the client to the portal website to obtain search results for the highlighted text;
   again downloading the portal website at the client, such that the search results are generated within the confines of the portal website; and
   crediting the portal website as a source of the search request, such that the portal website receives credit for directing traffic to the search provider, and the different website receives no credit for the search request.

5. The method of claim 4, further comprising:
   sending a request from the client for a uniform resource locator; and
   directing a portal website server to retrieve the search results from a search server of the search provider.

6. The method of claim 4, wherein activating the context menu comprises displaying a listing of selectable options for the selected text.

7. The method of claim 4, further comprising setting the source of the search request to be the portal website and not the different website being visited by the client.

8. The method of claim 4, for each search, further comprising returning a web browser at the client to the portal website with each search.

9. The method of claim 4, wherein the at least one option includes an option for performing a search from a listing of businesses.

10. The method of claim 4, wherein the at least one option includes an option for performing a search from a listing of commercially available products.

11. The method of claim 4, wherein the at least one option includes retrieving a dictionary meaning for the selected text.

12. A computer readable storage medium storing processor-executable instructions for performing a method for retrieving web documents, the method comprising:
   requesting and downloading a portal website at a client;
   downloading a portal linking tool to the client that permits a web browser to access the portal website from any website;
   requesting a different website at the client that is external to the portal website;
   downloading the different website;
   highlighting text in the different website;
   activating a context menu in the portal linking tool that presents an option to search for other web documents containing the highlighted text using a search provider associated with the portal website;
   sending a command from the client to the portal website to obtain search results for the highlighted text;
   again downloading the portal website at the client, such that the search results are generated within the confines of the portal website; and crediting the portal website as a source of the search request, such that the portal website receives credit for directing traffic to the search provider, and the different website receives no credit for the search request.

13. The computer readable storage medium of claim 12, further comprising instructions for:
sending a request from the client for a uniform resource locator; and
directing a portal website server to retrieve the search results from a search server of the search provider.

14. The computer readable storage medium of claim 12, further comprising instructions for setting the source of the search request to be the portal website and not the different website being visited by the client.

15. The computer readable storage medium of claim 12, for each search, further comprising instructions for returning a web browser at the client to the portal website with each search.

16. The system of claim 1, further comprising means for directing the client to a merchant web site although the portal website is not visited by the client during a current browsing session.

17. The method of claim 4, further comprising directing the client to a merchant web site although the portal website is not visited by the client during a current browsing session.

18. The computer readable storage medium of claim 12, further comprising instructions for directing the client to a merchant web site although the portal website is not visited by the client during a current browsing session.

* * * * *